Patented Jan. 19, 1926.

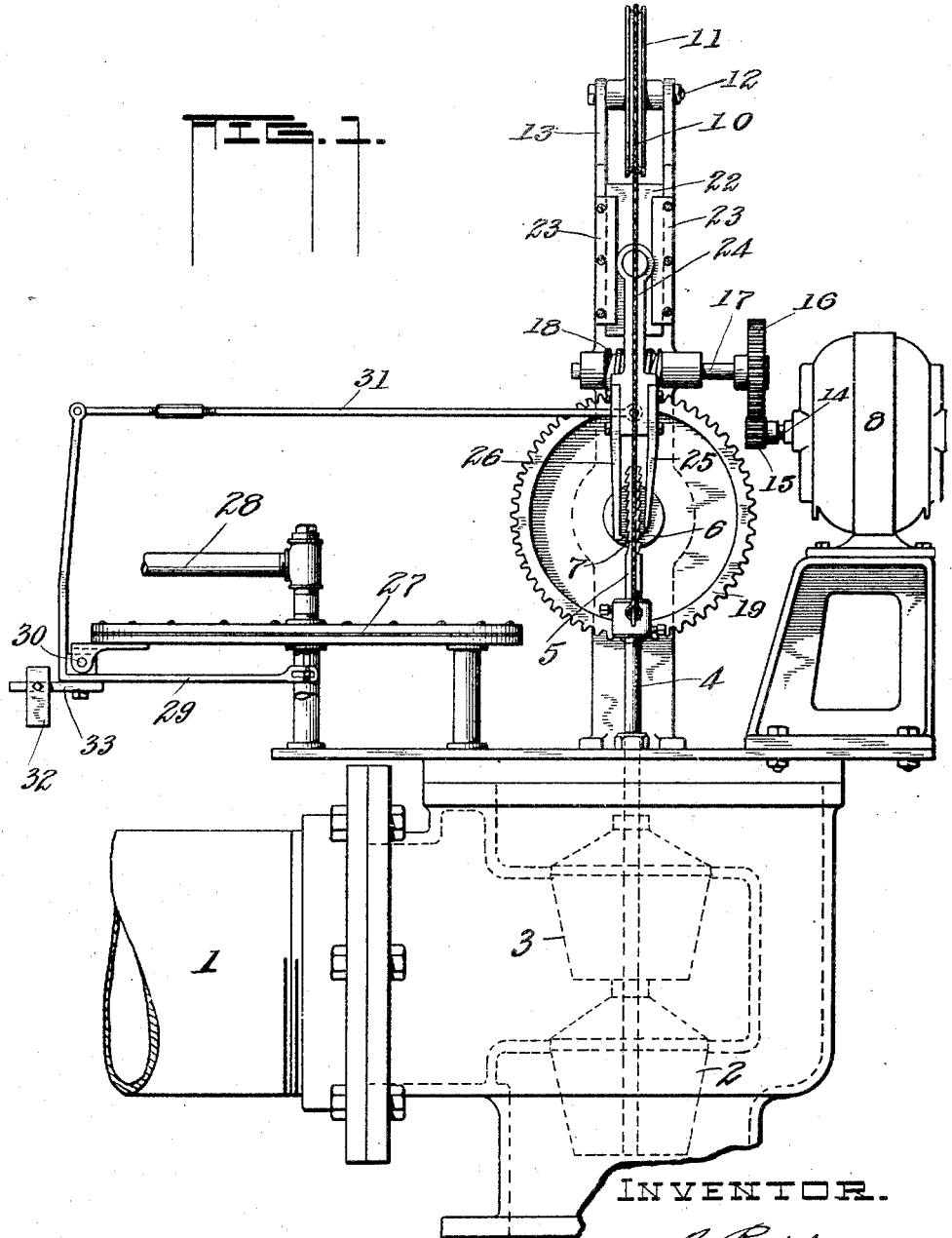

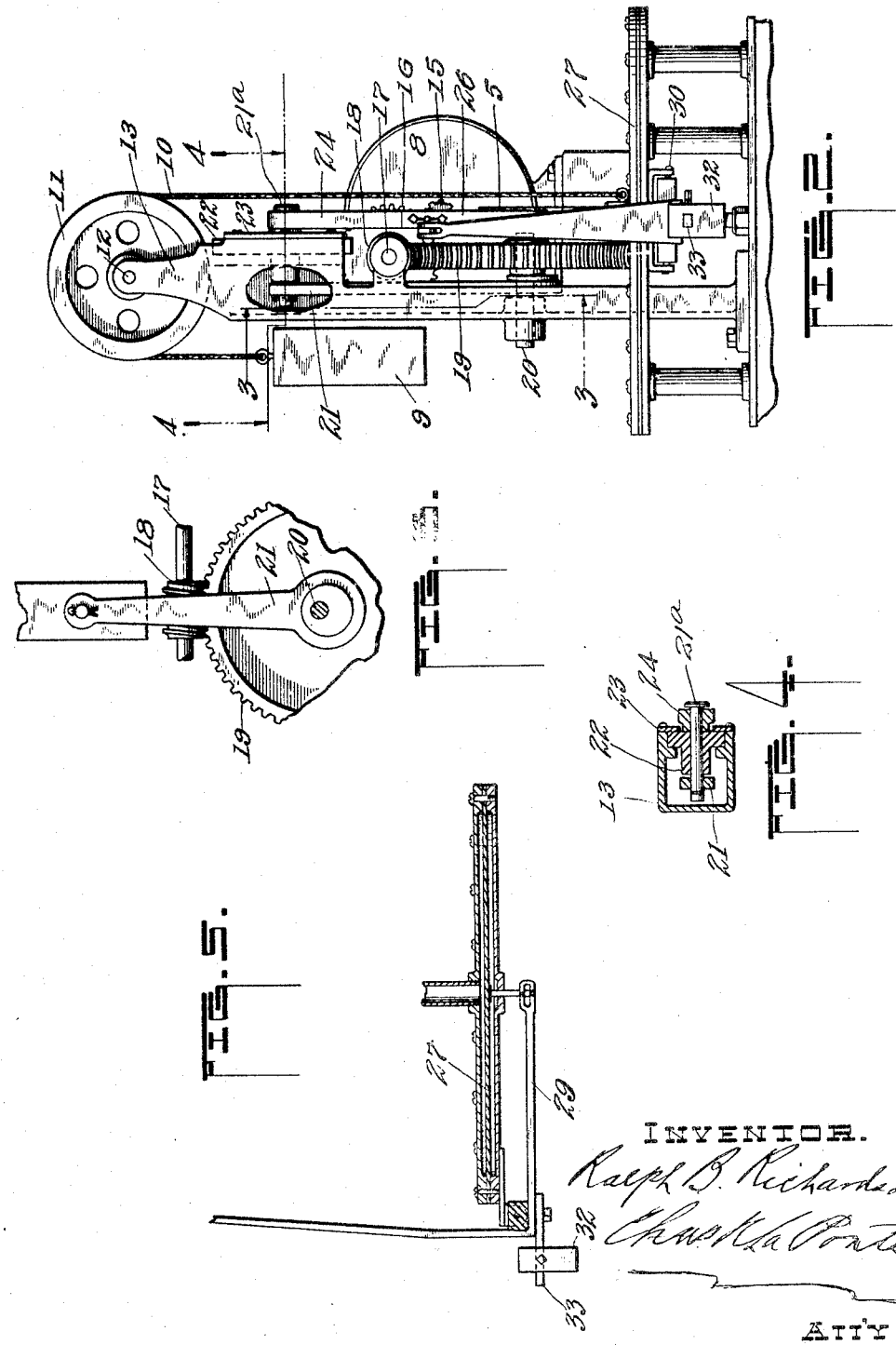

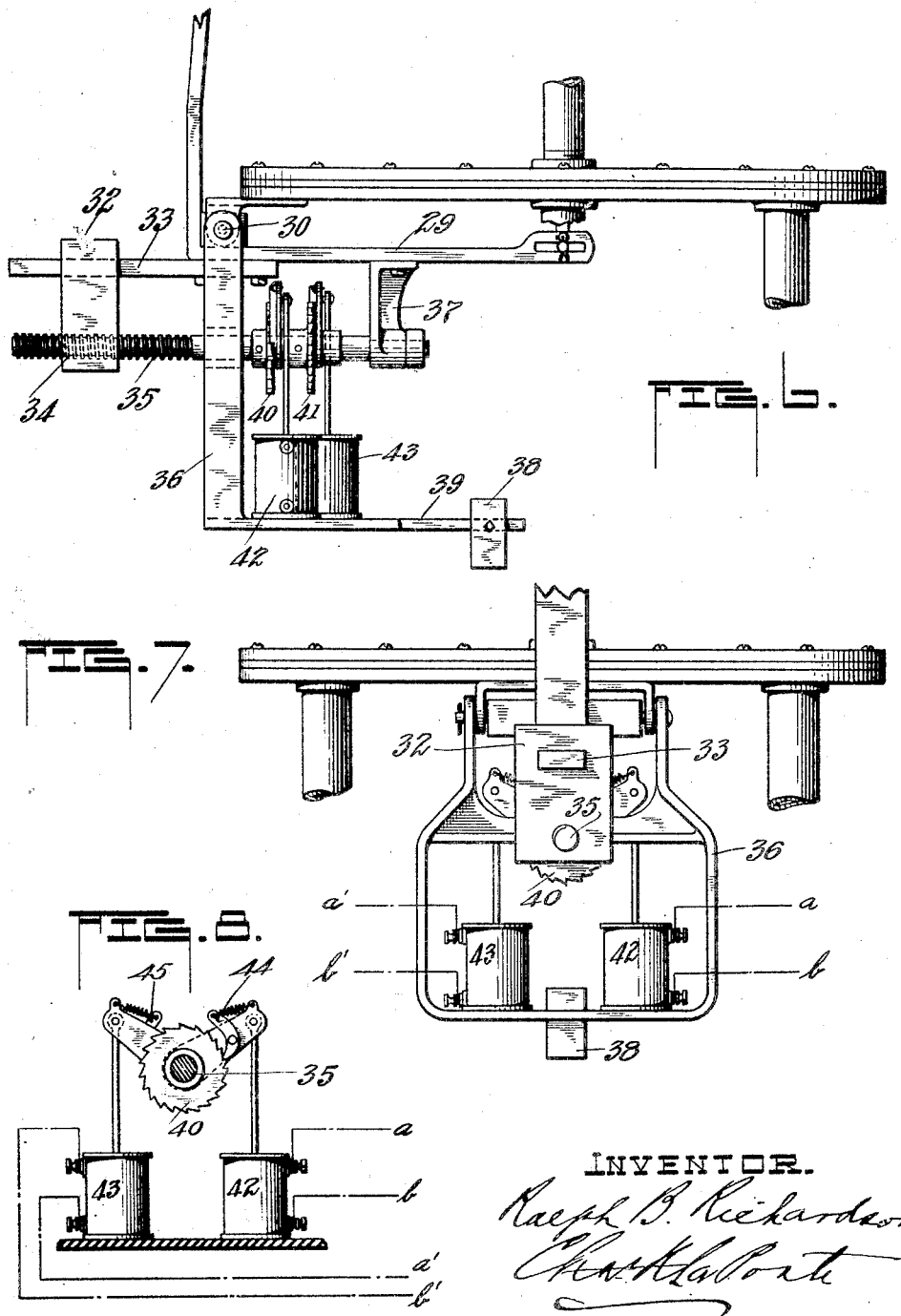

1,570,008

UNITED STATES PATENT OFFICE.

RALPH B. RICHARDSON, OF PEORIA, ILLINOIS.

GAS-MAIN CONTROLLER.

Application filed April 21, 1921. Serial No. 463,299.

*To all whom it may concern:*

Be it known that I, RALPH B. RICHARDSON, a citizen of the United States, a resident of Peoria, in the county of Peoria and State of Illinois, have invented new and useful Improvements in a Gas-Main Controller, of which the following is a specification.

This invention has reference to an apparatus for controlling the flow of gas.

The invention has for its principal object to provide an apparatus for controlling the pressure in the "collecting" or so-called "foul mains" in which gas is delivered from the retorts or ovens of gas works, and to accurately and reliably regulate such pressure for the purpose of obtaining a more efficient operation of the ovens and retorts at gas works.

More particularly the invention has for its object to provide a governor for controlling the operation of valves employed preferably in the collecting mains of coal gas plants; such governor being preferably continuously operated from any suitable motor and arranged to intermittently actuate said valves.

A further object of the invention is to provide means under the influence of the change in pressure in said collecting mains which may be caused to position the operating connections between the governor and the control valves as to intermittently and alternately open and close said valves, and thus regulate the flow of gas through said mains.

A still further object of the invention is to provide for the manual or automatic regulation of said means under the influence of the change in pressure in said collecting mains, so as to adjust the pressure at which the fluid is to be handled.

I am aware that attempts have been made to govern the pressure on the collecting mains of coal gas plants, but I am not aware that any such attempts have included a positive and continuously operated governor which is intermittently connected with the valves in such mains for opening and closing the same, and where such operating connections between governor and valves are under the control of and regulated by a means sensitive to and influenced by the change in the pressure in said collecting mains.

That the invention may be more fully understood reference is had to the accompanying drawings forming a part of the present description, illustrating a preferred embodiment of the invention in which:—

Fig. 1 shows in elevation a portion of the collecting main connected with an oven or retort house of a coal gas plant, and my improved governor and controlling means for operating the pressure regulating valves in said mains;

Fig. 2 is an end view of Fig. 1 looking in at the left hand end thereof;

Fig. 3 is a detail in elevation showing the eccentric means for reciprocating the elements through which power is imparted to open or close the valves, as the same would appear on the line 3—3 Fig. 2;

Fig. 4 is a cross-section in plan, as the same would appear if taken on the line 4—4 Fig. 2;

Fig. 5 is a vertical cross-section of the means, such for instance as the diaphragm constantly under the influence of the pressure in the collecting main and which is adapted to operate and position the connecting means between the governor and valves for opening or closing the latter;

Fig. 6 is an elevation showing a means for automatically varying the pressure setting of the governor;

Fig. 7 is an end view of Fig. 6 looking at the left hand end of said figure, and Fig. 8 is an elevation of the solenoids.

Like characters of reference denote corresponding parts throughout the figures.

In the drawings, what is commonly called and known as the collecting main which is connected with an oven or retort house of a coal gas plant is designated 1. This main is connected wtih the apparatus for purifying the gas before it is transferred to the places of use, and at a suitable point in the said main are preferably located valves 2 and 3 which regulate the flow of gas through the main and also govern the sub-atmospheric pressure or suction therein. These valves are connected with a stem 4 and extending preferably axially from said stem is a toothed bar, 5, provided on opposite sides and for a portion of its length with a plurality of oppositely cut or formed ratchet teeth 6 and 7. The teeth 6 are adapted to be engaged by means for moving the stem 4 in one direction to cause the valves 2 and 3 to close, and the teeth 7 to be engaged by means for moving the stem 4 in the opposite direction to cause the valves 2 and 3 to open. The valve stem 4, as will be understood, is intended to be intermittently actuated, and alternately in opposite directions as conditions of pressure in the collecting main 1 may require; whereas, the operating means for said stem 4 is continuously operated by a motor. I prefer that the stem 4 be reciprocated and that the means for actuating the same be also reciprocated. The power means employed, however, is preferably in the form of an electric motor 8 which requires means for converting the rotary movement of the motor into a reciprocal movement for said stem 4. The weight of the valves 2 and 3 is preferably counterbalanced by the weight 9 connected with the stem 4 through and by means of a soft strand of wire or cable 10 which passes over a sheave wheel 11 on a short shaft 12 journaled in suitable bearings at the head of a frame support 13.

On the motor shaft 14 is carried a small gear wheel 15 meshing with and driving a gear wheel 16 carried on a short shaft 17 journaled in suitable bearings on the frame support 13, and also on said shaft 17 is a worm gear 18 in mesh with and operating a large worm wheel 19 on a shaft 20 also journaled in suitable bearings on said frame support 13. To the shaft 20 is eccentrically connected an arm 21, which at its opposite end is pivotally connected with a block 22 slidable in guide-ways 23 in said frame support 13. To the pin 21ª forming the connection for the arm 21 with the block 22 is pivotally connected a connecting rod 24 to which are connected the pawls 25 and 26. The former adapted to be moved into contact with the ratchet teeth 6, and latter adapted to be moved into contact with the ratchet teeth 7, in a manner hereinafter referred to. The operation thus far is as follows:

Assuming the motor 8 to be connected with a suitable source of power, the gearing 15, 16, 18, and 19 will impart a reciprocal movement to the connecting rod 24 through the eccentric connection of the arm 21 with the shaft 20, as will be understood. Such reciprocal movement of the rod 24 is continuous so long as the motor 8 is in operation, and until the said rod 24 is positively oscillated to bring one or the other of the pawls 25 or 26 into contact with the teeth on the bar 5 there will be no movement of the stem 4 and the valves 2 and 3. However, as it is necessary to maintain the suction in the collecting main 1 constant, and in view of the fact that the pressure in said main will vary due to many and varying conditions, said pawls are arranged for oscillation by means under the influence of the change in pressure of the fluid in said collecting main, so that as such pressure varies the rod 24 will be swung first in one direction, then in the other, so as to reciprocate said valves 2 and 3 to seat or unseat the same as may be required to regulate and control the pressure in said collecting main. Therefore, while the rod 24 is continuously reciprocated it will be caused to impart movement to the valve stem 4 only as the pressure changes in the collecting main 1 and as such change is transmitted to the pawls 25 and 26. The connecting rod 24 is hung so as to be substantially as sensitive as a pendulum, and as said rod need only be oscillated but a very short distance to bring either of the pawls into contact with the ratchet teeth 6 or 7, it will be at once understood there is required little or no force to do this. The motor 8 is sufficient to move the stem 4 and the valves 2 and 3 against any resistance, such as heavy tar in the gas.

The rod 24 and the pawls 25 and 26 are oscillated through the movement of a diaphragm 27, and the movement of such diaphragm is controlled by the pressure in said main 1 which is reflected onto the diaphragm through a pipe 28 in communication with said collecting main 1. To the diaphragm is connected a rocker arm 29 which is fulcrumed at 30 and pivotally connected to the arm 29 and the rod 24 is an adjustable connecting rod 31. In one form of the apparatus the pressure at which the fluid is to be handled may be adjusted to suit conditions by means of the manually movable weight 32 slidable on an arm extension 33 from the rocker arm 29. This weight, as will be understood, counterbalances the weight of the diaphragm, and may be adjusted without in any way detracting from the sensitiveness of the governor or the parts 25 and 26 directly under the control of the diaphragm.

Assuming that the motor is connected with a source of power and that the pawls 25 and 26, through the means described, are being continuously reciprocated, as the pressure conditions in the main 1 varies from that to which such pressure is regulated by the weight 32, such change in condition is transmitted to the diaphragm and its movement is reflected to the rocker arm 29 and one or the other of the pawls 25 and 26 will be moved into the path of contact with the ratchet teeth on the arm 24, to be reciprocated up or down by such engagement, depending of course which of said pawls 25 or 26 is in position for contact with the toothed bar.

In Figs. 6 to 8 both inclusive, I have shown a means of automatically changing the position of the weight 32 on the arm extension 33, instead of by manual manipulation as hereinbefore described. Manual operation of the weight 32 will prove all sufficient under ordinary conditions of simple pressure control, but it is desirable to automatically regulate the pressure to which the governor is set, so that this pressure will change according to the variations in the quality of the gas in cases where the apparatus is used to control the partial vacuum or negative pressure of a coal gas retort or oven, and particularly in gas plants which are equipped with a recording calorimeter. Under such conditions an automatic control of the quality of the gas will increase the efficiency of the plant and also greatly increase the efficiency and usefulness of the consumer's appliances because of the increased uniformity of the product.

The construction and operation of recording calorimeters are well understood and it is not thought necessary to show the same as it in itself forms no part of the present invention except that certain solenoids to be referred to receive their current from such calorimeter.

In the modified form the weight 32 slides on the arm extension 33 as before and it has a threaded opening 34 therethrough which receives a screw bar or rod 35. The turning of the screw moving said weight on said arm extension as will be understood.

The screw bar or rod 35 has a bearing in a frame 36 fulcrumed on and suspended from the pivot pin 30 forming the fulcrum for the rocker arm 29, and also in a bearing 37, depending from said rocker arm 29. This construction, as is apparent, is such that the frame 36 and the rocker arm 29 will oscillate together on the pivot pin 30 and to balance the frame 36 to prevent binding of the screw bar or rod 35 there is provided a weight 38 slidable on an extension 39 of said frame. The screw bar or rod 35 has secured thereto the two ratchet wheels 40 and 41 with teeth pointed in opposite directions, whereby when engaged by certain pawls the screw bar or rod may be rotated alternately in opposite directions to move the weight 32 in opposite directions. Two solenoids 42 and 43 are supported by the frame 36 and they are operatively connected with ratchet pawls 44 and 45 associated with the respective ratchet wheels 40 and 41. The solenoids as shown are connected by suitable wiring $a$ $b$ and $a'$ $b'$ which lead to and are connected to the parts of a recording calorimeter. The operation of the indicator on the recording calorimeter will energize one or the other of the solenoids 42 or 43, in manner well known and impart the desired movement to the screw bar or rod 35, the resulting action of which will be to vary the suction in the main 1 according to the quality of the gas, and the governor will be operated in the manner explained to regulate the valves to govern the suction in said main.

While I have elected to show an electrically actuated means under the control of a calorimeter to automatically regulate the weight 32 for the purpose of varying the vacuum, it is to be understood that other automatic means may be employed to accomplish this result without departing from the spirit and scope of the invention.

What I claim is:

1. In a gas main controller in combination with the valves of a collecting main, a motor, reciprocally operated means for actuating said valves, means for continuously operating said valve actuating means from said motor, said valve actuating means including oscillatory means arranged for connection with said valves to alternately move the same in opposite directions, an actuating means operable by and under the changed conditions of pressure in said collecting main, a rocker arm connected between said actuating means and said oscillatory means, and an adjustable weight connected with said rocker arm, whereby the pressure at which the fluid is to be handled may be regulated.

2. In a gas main controller, in combination with reciprocally actuated valves of a collecting main, a stem connected with said valves having oppositely disposed teeth, a pivotally supported continuously reciprocated member, means on said member for alternately engaging the teeth of said stem to reciprocate the latter in opposite directions, and means for controlling the oscillation of said member to govern said engaging means.

3. In a gas main controller, in combination with reciprocally actuated valves of a collecting main, a stem connected with said valves having oppositely disposed teeth, a pivotally supported continuously reciprocated member, means on said member for alternately engaging the teeth of said stem to reciprocate the latter in opposite directions, an actuating means operable by and under the changed conditions of pressure in said main, and operating connections between said actuating means and said stem engaging means.

4. In a gas main controller, in combination with reciprocally actuated valves of a collecting main, a stem connected with said valves having oppositely disposed teeth, a pivotally supported continuously reciprocated member, means on said member for alternately engaging the teeth of said stem to reciprocate the latter in opposite directions, an actuating means operable by and under the changed conditions of pressure in said main, operating connections between said actuating means and said stem engaging means, and an adjustable weight connected with said operating connections, whereby the pressure at which the gas is to be handled may be regulated.

5. In a gas main controller, in combination with reciprocally actuated valves of a collecting main, a stem connected with said valves having oppositely disposed teeth, a pivotally supported continuously reciprocated member, means on said member for alternately engaging the teeth of said stem to reciprocate the latter in opposite directions, an actuating means operable by and under the changed conditions of pressure in said main, operating connections between said actuating means and said stem engaging means, an adjustable weight connected with said operating connections, and means for automatically adjusting said weight, whereby the pressure at which the gas is to be handled may be regulated.

6. In a gas main controller, in combination with reciprocally actuated valves of a collecting main, a stem connected with said valves having oppositely disposed teeth, a shaft, a motor, means for operating said shaft from said motor, a reciprocal member, means eccentrically connected with said shaft and arranged to reciprocate said member, a bar pivotally connected with said reciprocal member, means on said bar arranged to alternately engage the oppositely disposed teeth on said stem, an actuating means, and operating connections between said actuating means and said pivoted bar.

7. In a gas main controller, in combination with reciprocally actuated valves of a collecting main, a stem connected with said valves having oppositely disposed teeth, a shaft, a motor, means for operating said shaft from said motor, a reciprocal member, means eccentrically connected with said shaft and arranged to reciprocate said member, a bar pivotally connected with said reciprocal member, means on said bar arranged to alternately engage the oppositely disposed teeth on said stem, an actuating means, a rocker arm connecting said actuating means with said pivoted bar, and a weight adjustably connected with said rocker arm.

RALPH B. RICHARDSON.